US009177163B1

(12) United States Patent
Fredinburg et al.

(10) Patent No.: US 9,177,163 B1
(45) Date of Patent: Nov. 3, 2015

(54) DATA ACCESS LOCKDOWN

(71) Applicant: Google Inc., Mountain View, CA (US)

(72) Inventors: Dan Fredinburg, San Francisco, CA (US); Andreas Michael Tuerk, Woerthsee (DE)

(73) Assignee: GOOGLE INC., Mountain View, CA (US)

( * ) Notice: Subject to any disclaimer, the term of this patent is extended or adjusted under 35 U.S.C. 154(b) by 98 days.

(21) Appl. No.: 14/098,377

(22) Filed: Dec. 5, 2013

Related U.S. Application Data

(60) Provisional application No. 61/789,017, filed on Mar. 15, 2013.

(51) Int. Cl.
*G06F 21/00* (2013.01)
*G06F 21/60* (2013.01)
*G06F 21/62* (2013.01)

(52) U.S. Cl.
CPC .......... *G06F 21/604* (2013.01); *G06F 21/6245* (2013.01); *G06F 21/6263* (2013.01)

(58) Field of Classification Search
CPC   G06F 21/604; G06F 21/6245; G06F 21/6263
USPC .......................................................... 726/28
See application file for complete search history.

(56) References Cited

U.S. PATENT DOCUMENTS

| 8,627,506 | B2 * | 1/2014 | Vera et al. ........................ 726/30 |
| 8,849,721 | B2 * | 9/2014 | Fedorov et al. ............... 705/319 |
| 2003/0028639 | A1 * | 2/2003 | Yamamoto et al. ........... 709/225 |
| 2007/0083463 | A1 | 4/2007 | Kraft |
| 2010/0077471 | A1 | 3/2010 | Schleiss et al. |
| 2012/0180135 | A1 * | 7/2012 | Hodges et al. .................. 726/26 |
| 2013/0191540 | A1 * | 7/2013 | Shimizu ........................ 709/225 |
| 2014/0279068 | A1 * | 9/2014 | Systrom et al. ............ 705/14.73 |
| 2015/0013016 | A1 * | 1/2015 | Kanter et al. .................... 726/28 |

OTHER PUBLICATIONS

Black, R., Facebook Launches 'Panic Button' for Kids, NYDailyNews.com, Jul. 12, 2010, 2 pgs, [retrieved on Mar. 5, 2012] [online] URL: http://www.nydailynews.com/2.1353/facebook-launches-panic-button-kids-article-1.468152.

* cited by examiner

*Primary Examiner* — Hadi Armouche
*Assistant Examiner* — Ali Shayanfar
(74) *Attorney, Agent, or Firm* — Cory Procopio; Hargreaves & Savitch LLP

(57) ABSTRACT

Data access lockdown is described, including receiving a request from a first user to disable access to all data that are access-controlled by the first user based on at least one setting. The data are shared with at least one other user. In response to the request, modifying, without further action by the first user, the at least one setting by replacing a current value indicative of at least some of the data being shared, with a lockdown value indicative of disablement of access to all the data access-controlled by the first user, so as to prevent the at least one other user from accessing any of the data.

20 Claims, 5 Drawing Sheets

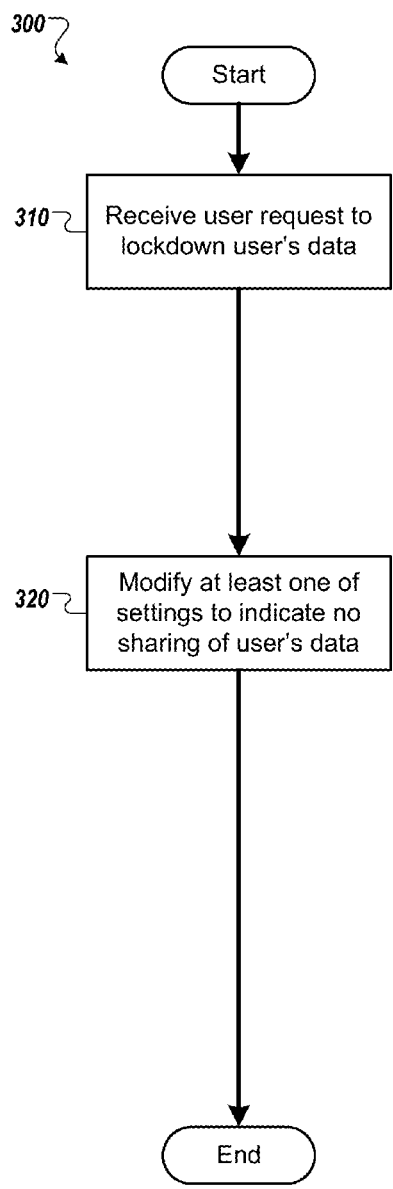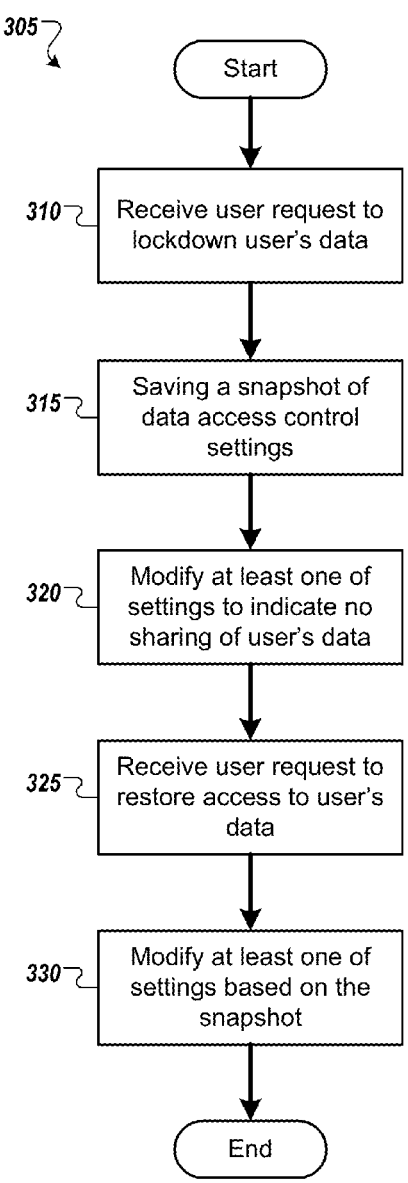
FIG. 3A
FIG. 3B

DATA ACCESS LOCKDOWN

BACKGROUND

1. Technical Field

The subject matter described herein relates generally to online services and, more particularly, to data access lockdown.

2. Related Background

A typical person may have at least one online account. Commonly, people have online accounts that are associated with electronic communication (e.g., email), photo sharing services, video sharing websites, social networks, etc.

A user of the online account shares information with other users. The user may directly share information with another user (e.g., in an email message). The user may indirectly share information with another user through, for example, an online social network (e.g., posting content on an online social network that is not designated for any specific user, but for a plurality of users having a common trait or characteristic).

A user may share information with another user in situations where sharing may not be intended. For example, a user may store information (e.g., text, audio, video, or image file) in a shared storage system (e.g., cloud storage) but may not restrict other users from listening to, downloading, or otherwise accessing the information.

At one point or another, sharing information online may pose problems that need to be resolved, such as unauthorized access or data leakage.

SUMMARY

Data access lockdown is described. Users are provided with the ability to quickly suspend (e.g., put on hold or "lock down") portions of their online accounts or all of their online accounts on hold to address problems that may have arisen with their accounts.

The subject matter includes at least a system, a product, and a method for receiving a request from a first user to disable access to all data that are access-controlled by the first user based on at least one setting. The data are shared with at least one other user. In response to the request, modifying, without further action by the first user, the at least one setting by replacing a current value indicative of at least some of the data being shared, with a lockdown value indicative of disablement of access to all the data access-controlled by the first user, so as to prevent the other user (e.g., at least one other user) from accessing any of the data.

According to an example implementation, a computer-implemented method for disabling access to all data access-controlled by a first user is provided, the method comprising receiving a request from the first user to disable access to the data access-controlled by the first user based on at least one setting, wherein the data are shared with at least one other user; and in response to the request, modifying, without further action by the first user, the at least one setting by replacing a current value indicative of at least some of the data being shared, with a lockdown value indicative of disablement of access to all the data access-controlled by the first user, so as to prevent the at least one other user from accessing any of the data.

According to another example implementation, a computer-implemented method for disabling at least one other user from accessing all data controlled by a first user is provided, the method comprising receiving a request from the first user to disable all the data controlled by the first user and shared with the at least one other user, wherein the first user can control access to the data based on at least one setting; and in response to the request, modifying, without further action by the first user, the at least one setting by replacing a current value indicative of the data being shared, with a lockdown value indicative of disablement of access to all data controlled by the first user, so as to prevent the at least one other user from accessing the shared data.

According to yet another example implementation, a non-transitory computer readable medium having stored therein computer executable instructions for disabling at least one other user from accessing all data controlled by a first user is provided, the instructions comprising receiving a request from the first user to disable all the data controlled by the first user and shared with the at least one other user, wherein the first user can control access to the data based on at least one setting; and in response to the request, modifying, without further action by the first user, the at least one setting by replacing a current value indicative of the data being shared, with a lockdown value indicative of disablement of access to all data controlled by the first user, so as to prevent the at least one other user from accessing the shared data.

According to still another example implementation, at least one device comprising storage and at least one processor configured to disable at least one other user from accessing all data controlled by a first user is provided, wherein the at least one processor receives a request from the first user to disable all the data controlled by the first user and shared with the at least one other user, wherein the first user can control access to the data based on at least one setting; and in response to the request, modifies, without further action by the first user, the at least one setting by replacing a current value indicative of the data being shared, with a lockdown value indicative of disablement of access to all data controlled by the first user, so as to prevent the at least one other user from accessing the shared data.

According to an additional example implementation, a non-transitory computer readable medium having stored therein computer executable instructions for disabling access to all data that are access-controlled by a first user is provided, the instructions comprising receiving a request from the first user to disable access to the data that are access-controlled by the first user based on at least one setting, wherein the data are shared with at least one other user; and in response to the request, modifying, without further action by the first user, the at least one setting by replacing a current value indicative of at least some of the data being shared, with a lockdown value indicative of disablement of access to all the data access-controlled by the first user, so as to prevent the at least one other user from accessing any of the data.

According to another example implementation, at least one device comprising storage and at least one processor configured to disable access to all data that are access-controlled by a first user, wherein the at least one processor receives a request from the first user to disable access to the data that are access-controlled by the first user based on at least one setting, wherein the data are shared with at least one other user; and in response to the request, modifies, without further action by the first user, the at least one setting by replacing a current value indicative of at least some of the data being shared, with a lockdown value indicative of disablement of access to all the data access-controlled by the first user, so as to prevent the at least one other user from accessing any of the data.

BRIEF DESCRIPTION OF THE DRAWINGS

FIG. 3A shows an example process suitable for implementing some example implementations.

FIG. 3B shows another example process suitable for implementing at least one example implementation.

DETAILED DESCRIPTION

The subject matter described herein is taught by way of example implementations. Various details have been omitted for the sake of clarity and to avoid obscuring the subject matter. Examples shown below are directed to structures and functions for implementing data access lockdown.

DEFINITIONS

As used herein, the term "online account" or "account" refers to a product, service, or application associated with a user (e.g., user JJ335). A user may have, subscribe to, and/or use one or more accounts or online accounts (e.g., JJ335 may have an email account, a social network account, a photo sharing account, a video sharing account, an online storage account, a mobile account, a blog account, etc.). Here, each of the email service, social network, photo sharing service, video sharing service, online storage, mobile service, etc. can be referred to as a product, service, or application.

Other products may include, but are not limited to, maps, generalized user query (e.g., general search), focused search (e.g., searching people, patent, scholar, etc.), shopping cart, checkout, news, translation, toolbar, calendar, instant messaging, short message service, voice, phone, toll-free service, etc.

An account can be an internet or external account (e.g., an end user subscribing to an openly, publicly, or semi-publicly available service), an intranet or internal account (e.g., an employee subscribing to a service of a company or firm), an extranet or controlled availability account (e.g., an account available to vendors, customers, or other controlled subscribers), or another type of account.

Overview

Users are provided with the ability to quickly suspend (e.g., put on hold or "lock down") portions of their online accounts or all of their online accounts on hold to address problems that may have arisen with their accounts. For example, a user may lock down one or more of his or her accounts for any reason, such as to investigate a data leakage or correct unintended disclosure of information that might tarnish his or her reputation. This lockdown capability may be implemented by an object or a mechanism that provides a simple control or button (e.g., single-action or one-click widget) to allow a user to quickly and temporarily hide or lock down access to all of his or her data across one or more online accounts.

Figure 1:
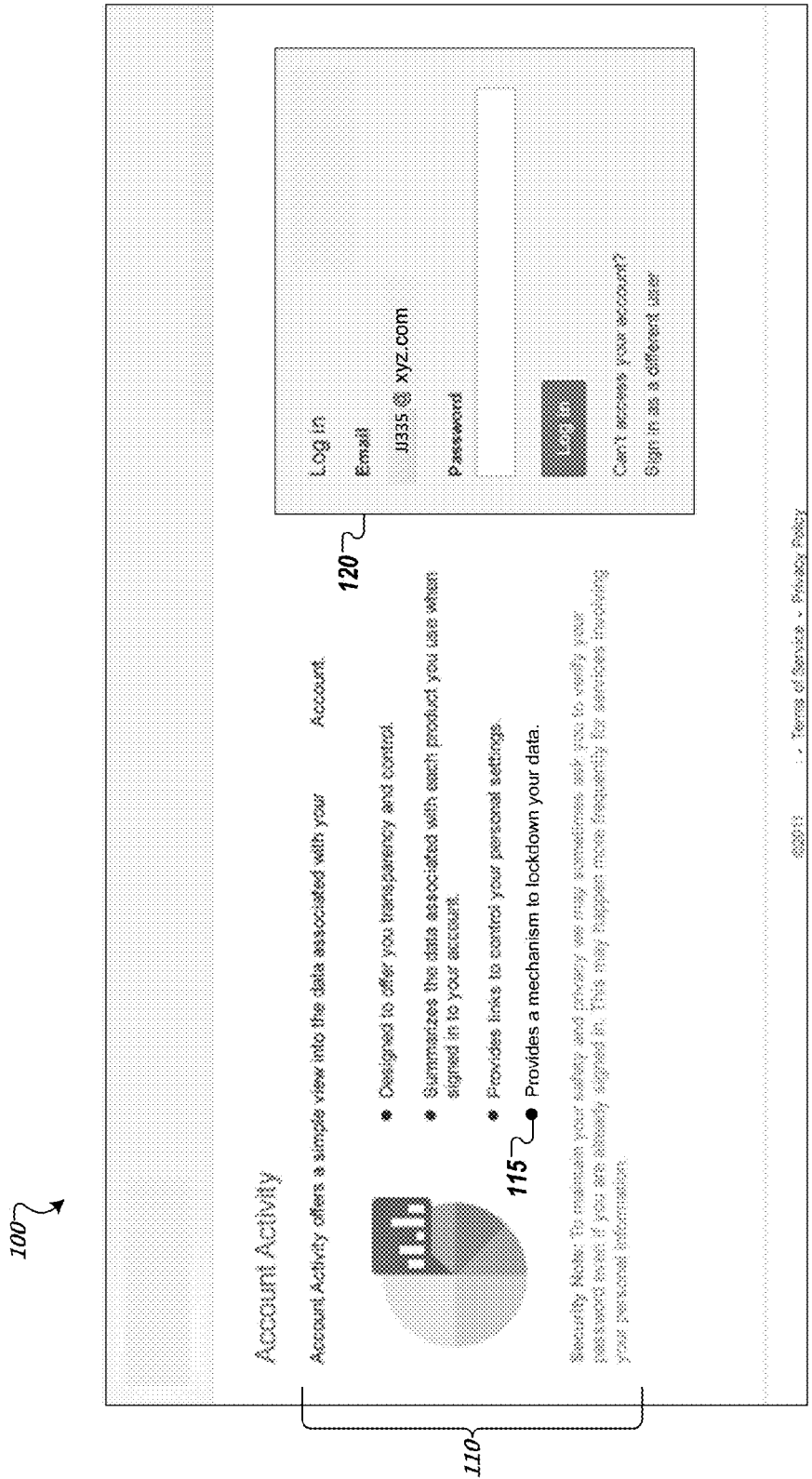
FIG. 1 shows an example login user interface according to at least one example implementation.

FIG. 1 shows an example login user interface according to at least one example implementation. User interface (UI) 100 includes information 110, which informs a user of various available features that may include a lockdown option 115. A user (e.g., user JJ335) may login through widget 120. For example, a text field or fields may prompt the user to enter a user name and password. After logging in, information 110 indicates that user JJ335 may view summaries of data associated with each product used, control personal settings, and/or lockdown the user's data.

Figure 2A:
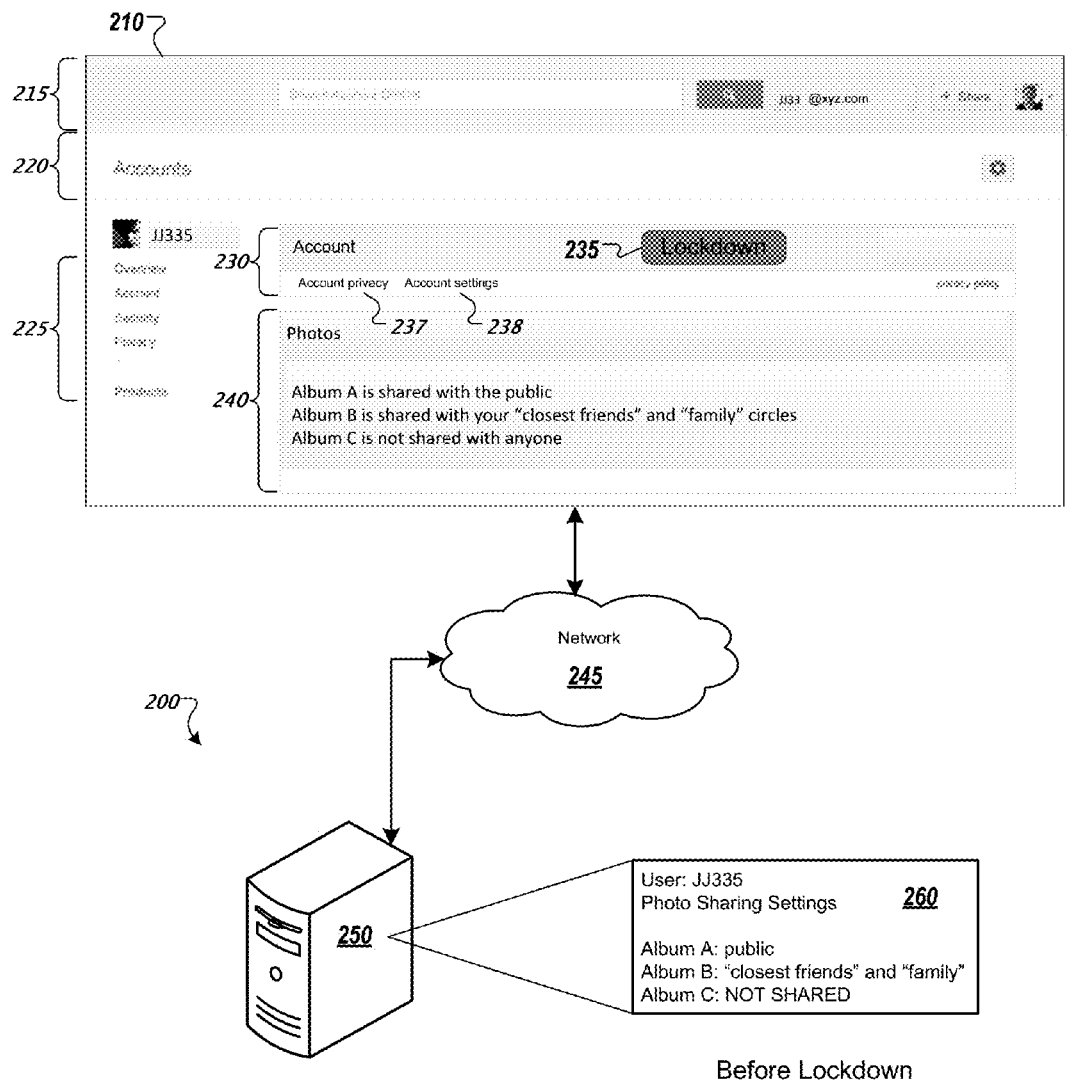
FIG. 2A shows an example environment where a lockdown button can be implemented according to some example implementations.

FIG. 2A shows an example environment where a lockdown button can be implemented according to some example implementations. Environment 200 includes UI 210, which is presented on a device (not shown) communicatively connected to service provider 250 through, for example, network 245.

UI 210 includes, in region 215, an icon, search input box and other information and/or widgets. Region 220 may show information such as a page title (e.g., "Accounts"). Below region 220 may be a region (e.g., column) of navigation options 225. To the right of navigation options 225 may be a content heading (e.g., "Account") and a lockdown button 235 in region 230, including account privacy 237 and account settings 238. Below region 230 may be one or more regions of content, such as region 240. The layout, information, widgets, and content shown in UI 210 are for illustration purposes only. In implementation, any of the layout, information, widgets, and content may be different. For example, the spatial arrangement and orientation of the various regions may be modified, as would be understood by one skilled in the art.

JJ335's "Photos" account in region 240 shows that his or her "Album A" is shared with the public, "Album B" is shared with his or her "closest friends" and "family" circles, and "Album C" is not shared with anyone. JJ335 may control the sharing of his or her albums and/or photos using one or more settings 260, which may be stored at service provider 250.

There may be one or more UI widgets (not shown) that allow JJ335 to change any of the settings (e.g., settings 260). For example, a UI widget (not shown) may allow JJ335 to grant, modify, or deny access to "Album C" or other albums. Granting or modifying access may be done by selecting or identifying one or more users, circles, social graphs, groups, or combination thereof. In some example implementations, there may be one or more preset or predetermined values (e.g., "public," "none," NULL, etc.) that JJ335 may select.

The selected users, groups, social graphs, circles, and/or preset values are saved in one or more settings associated with "Album C" and stored in, for example, service provider 250 as settings 260. To deny access to any albums, JJ335 may deselect the associated users and/or groups, or simply select "none" or NULL, if available, to replace the values of the settings associated with the albums. In some example implementations, access control may be performed on other or additional levels, granularity, or a combination thereof. For example, access-control may be per-photo or per-image, per-album, per-event, or per-other unit. An event may be an organization of a number of albums and/or photos.

A mechanism, such as "Lockdown" object (e.g., button) 235 or another widget, can be implemented to provide JJ335 the ability to quickly suspend or disable access by other users to the entire "Photos" account (region 240). Here, as an example, JJ335 locks down the data of the "Photos" account by selecting (e.g., pushing or clicking) on the "Lockdown" object 235.

In some example implementations, JJ335 may subscribe to and use other online services or products. For example, JJ335 may have an email account, a video sharing account, a social network account, mobile service account, and other accounts. Data and/or usage associated with these accounts may be summarized and provided in UI 210, for example, as additional regions (not shown) below region 240. Regardless of how many accounts JJ335 may have, a single activation of the "Lockdown" button 235 may lockdown the data of all of JJ335's accounts.

In some example implementations, a user (e.g., JJ335) may be given a choice (e.g., using a UI widget, not shown) to select any of his or her online accounts, including from one account to all accounts, to lock down the data. For example, JJ335 may lock down one account at a time, a group of two or more accounts at a time, or all accounts at once.

Service provider 250 receives the input generated by the activation of the "Lockdown" button 235 via network 245. The input is interpreted by the service provider 250 as a request for the locking down of (e.g., suspending or disabling access to) all of JJ335's shared data associated with the "Photos" account. JJ335's shared data are all the data JJ335 has control over his or her access using, for example, settings 260.

In response to the request, service provider 250 modifies settings 260 without requiring further action by JJ335 (e.g., JJ335 does not need to change the settings himself or herself). Settings 260 may be any settings, including privacy settings, such as settings used to control JJ335's visibility and/or personalization. Some or all of settings 260 are modified to the most restrictive values (e.g., allowing only JJ335 to access data associated with his or her accounts).

Figure 2B:
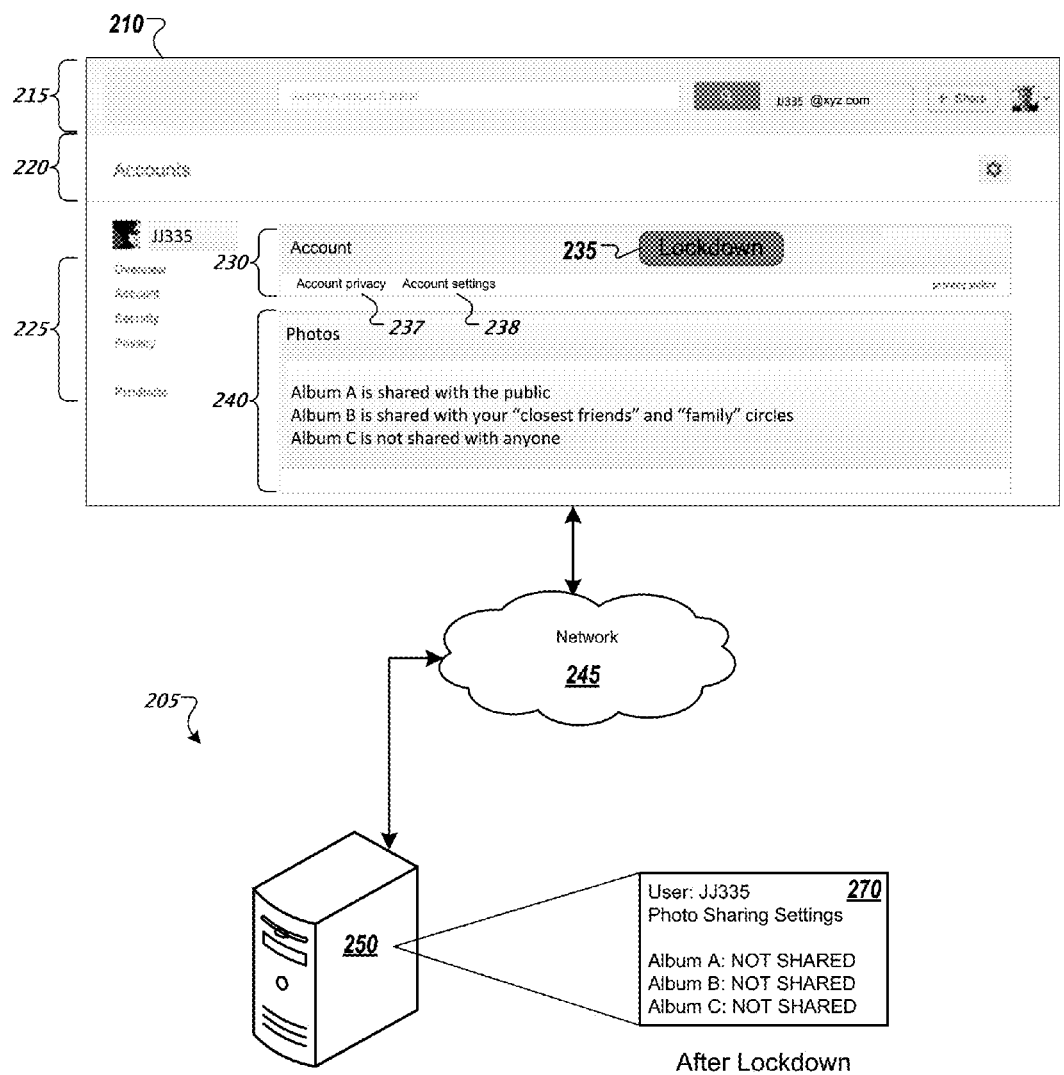
FIG. 2B shows the example of FIG. 2A after activating the lockdown button.

FIG. 2B shows the example of FIG. 2A after activating the lockdown button. Environment 205 of FIG. 2B illustrates that the settings 260 of environment 200 (FIG. 2A) become settings 270 after lockdown. For example, setting for "Album A" is changed from "public" (e.g., any user may access) or other value to "NOT SHARED." Setting for "Album B" is changed from "'closest friends' and 'family'" or other value to "NOT SHARED." Setting for "Album C" is already set to "NOT SHARED" so its value is not changed. In some example implementations, for ease of implementation (e.g., eliminating the need to check the current values) the current values for all settings are changed, including the setting for "Album C."

In FIG. 2B, settings 270 show the settings 260 of FIG. 2A, after their values have been changed, for example, to "NOT SHARED." The value "NOT SHARED" is a lockdown value indicative of disablement of access to all of JJ335's shared data. After lockdown, all users, including those with access to JJ335's data at the moment of the lockdown, are prevented from accessing JJ335's shared data.

In situations where a user (e.g., JJ335) has more accounts (not shown), settings 260 would show the settings used to control data access associated with one or more of the additional accounts. Settings 270 show the state of the settings after a lockdown request has been received and processed.

In some example implementations, a lockdown leads to restricting the access control lists (e.g., in addition to settings 270 of FIG. 2B) on JJ335's data to only allow JJ335 to have access to the data. In other example implementations, a lockdown further leads to system 250 de-indexing or removing from access by search engine information associated with JJ335 (e.g., his or her profile, blog, and other data associated with him or her).

In some example implementations, one or more snapshots that represent the user's settings prior to lockdown (e.g., settings 260 of FIG. 2A) may be taken. The snapshots may be used in reversing the lockdown. For example, the reversing may occur based on a user command (e.g., clicking on a "Reverse Lockdown" button, not shown), and time trigger, or due to action by an account administrator.

To reverse a lockdown operation, one or more snapshots of pre-lockdown settings 260 may be used to determine their values. Post-lockdown settings 270 are replaced with the values determined from the snapshots of pre-lockdown settings 260.

In some example implementations, the reversing may be piecemeal or gradual. For example, a user may reverse the lockdown one or more settings at a time, one or more users at a time, one or more groups, circles, or social graphs at a time, one or more accounts at a time, or by another gradual fashion. In other implementations, the reversing may be performed in response to a single command or single action by the user (e.g., clicking on a "Reverse Lockdown" button, not shown).

Example Processes

FIG. 3A shows an example process suitable for implementing some example implementations. At step 310, a request is received from a user to lockdown his or her data. The lockdown command as executed based on the user request disables access to the data that are access-controlled by the user based on at least one setting. The data are shared with at least one other user, such as sharing photos, other media, information, text, posts on social networks, etc.

In response to the request, one or more settings may be modified at step 320. The modifications are automatically performed without further action by the user. In some example implementations, other access controls lists (ACLs) may be modified and/or information associated with the user may be removed from access by a search engine of other products and/or services. The modification of the settings and ACLs are done to replace the current values to other values that indicate access to the user's data is disabled or not permitted.

FIG. 3B shows another example process suitable for implementing at least one example implementation. Process 305 is shown with additional operations to process 300 of FIG. 3A. As shown above with respect to FIG. 3A, step 310 is performed. Before the operations at step 320, one or more snapshots of the current values or current states of the settings and ACLs may be taken or saved at step 315. As shown above with respect to FIG. 3A, step 320 is performed.

When the user decides that it is time to terminate the lockdown or restore access to some or all of his or her data, the user may issue a request at step 325. For example, after the user's accounts have been locked down, the "Lockdown" object 235 (FIG. 2) may be replaced by a "Reverse Lockdown" object (e.g., button) or another widget to the same effect.

The user may activate the button to generate the request. In response to the request, one or more settings or ACLs may be restored to the pre-lockdown values, which are recorded in one or more snapshots. The user's information may be made available to a search engine and/or other products.

In some examples, processes 300 and 305 may be implemented with different, fewer, or more steps. Processes 300 and 305 may be implemented as computer executable instructions, which can be stored on a medium, loaded onto one or processors of one or more computing devices, and executed as a computer-implemented method.

Example Computing Devices and Environments

Figure 4:
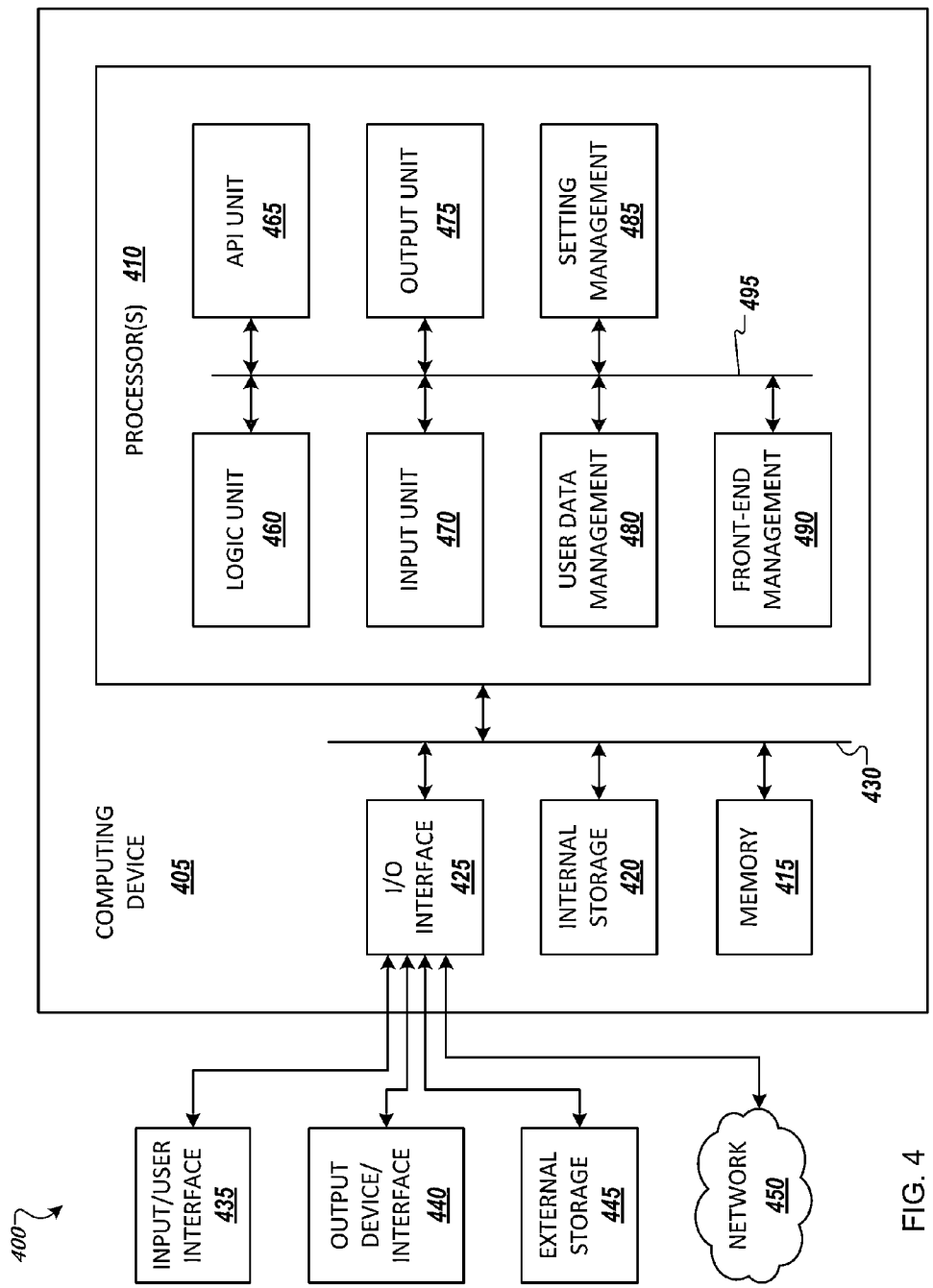
FIG. 4 shows an example computing environment with an example computing device suitable for implementing at least one example implementation.

FIG. 4 shows an example computing environment with an example computing device suitable for implementing at least one example implementation. Computing device 405 in computing environment 400 can include one or more processing units, cores, or processors 410, memory 415 (e.g., RAM, ROM, and/or the like), internal storage 420 (e.g., magnetic, optical, solid state storage, and/or organic), and I/O interface 425, all of which can be coupled on a communication mechanism or bus 430 for communicating information.

Computing device 405 can be communicatively coupled to input/user interface 435 and output device/interface 440. Either one or both of input/user interface 435 and output device/interface 440 can be wired or wireless interface and can be detachable. Input/user interface 435 may include any device, component, sensor, or interface, physical or virtual, which can be used to provide input (e.g., keyboard, a pointing/cursor control, microphone, camera, braille, motion sensor, optical reader, and/or the like). Output device/interface 440 may include a display, monitor, printer, speaker, braille, or the like. In some example implementations, input/user interface 435 and output device/interface 440 can be embedded with or physically coupled to computing device 405 (e.g., a mobile computing device with buttons or touch-screen input/user interface and an output or printing display, or a television).

Computing device 405 can be communicatively coupled to external storage 445 and network 450 for communicating with any number of networked components, devices, and systems, including one or more computing devices of same or different configuration. Computing device 405 or any connected computing device can be functioning as, providing services of, or referred to as a server, client, thin server, general machine, special-purpose machine, or another label.

I/O interface 425 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 400. Network 450 can be any network or combination of networks (e.g., the Internet, local area network, wide area network, a telephonic network, a cellular network, satellite network, and the like).

Computing device 405 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 405 can be used to implement techniques, methods, applications, processes, or computer-executable instructions to implement at least one implementation (e.g., a described implementation). Computer-executable instructions can be retrieved from transitory media, and stored on and retrieved from non-transitory media. The executable instructions can be originated from one or more of any programming, scripting, and machine languages (e.g., C, C++, C#, Java, Visual Basic, Python, Perl, JavaScript, and others).

Processor(s) 410 can execute under any operating system (OS) (not shown), in a native or virtual environment. To implement a described implementation, one or more applications can be deployed that include logic unit 460, application programming interface (API) unit 465, input unit 470, output unit 475, user data management unit 480, setting management unit 485, front-end management unit 490, and inter-unit communication mechanism 495 for the different units to communicate with each other, with the OS, and with other applications (not shown). For example, user data management unit 480, setting management unit 485, front-end management unit 490 may implement one or more processes shown in FIGS. 3A and 3B. The described units and elements can be varied in design, function, configuration, or implementation and are not limited to the descriptions provided.

In some example implementations, when information or an execution instruction is received by API unit 465, it may be communicated to one or more other units (e.g., logic unit 460, input unit 470, output unit 475, user data management unit 480, setting management unit 485, front-end management unit 490). For example, after input unit 470 has detected a user lockdown request (e.g., detecting the Lockdown button 235, FIG. 2, being activated), input unit 470 may use API unit 465 to communicate the user indication to user data management unit 480. User data management unit 480 may, via API unit 445, communicate the user request to the setting management unit 485 to modify one or more user settings. Using API unit 465, user data management unit 480 may interact with front-end management unit 490. Front-end management unit 490 may then use output unit 475 to present the post-lockdown results to the user (e.g., showing that the setting for Albums A-C are now set to not sharing with anyone.

In some examples, logic unit 460 may be configured to control the information flow among the units and direct the services provided by API unit 465, input unit 470, output unit 475, user data management unit 480, setting management unit 485, front-end management unit 490 in order to implement an implementation described above. For example, the flow of one or more processes or implementations may be controlled by logic unit 460 alone or in conjunction with API unit 465.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be embodied in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method for disabling access to all data access-controlled by a first user, the method comprising:

receiving a request from the first user to disable access to the data access-controlled by the first user based on at least one setting, wherein the data are shared with at least one other user and associated with a plurality of online accounts;

in response to the request, modifying, without further action by the first user, the at least one setting by replacing a current value indicative of at least some of the data being shared, with a lockdown value indicative of disablement by restricting access to an access control list for all the data access-controlled by the first user for at least one of the plurality of online accounts, so as to prevent the at least one other user from accessing any of the data, wherein prior to the modifying, a snapshot is saved that comprises the current value being associated with the at least one setting prior to the disablement at a time of the request from the first user; and in response to the another request received from the first user to restore access to at least some of the data, reversing the at least one setting that was disabled by the disabling, based on the snapshot, and by using the snapshot, determining a prior value of the at least one setting at the time of the request from the first user, and setting the value of the at least one setting to the prior value, wherein the user is provided with an option to control which of the plurality of online accounts are disabled by the restricting, and wherein the option to control is independent of a number or a type of the online accounts.

2. The method of claim 1, wherein the request from the first user is generated from a single action performed by the first user.

3. The method of claim 1, wherein the modifying further comprises modifying, without further action by the first user, another one of the at least one setting by replacing another current value indicative of at least some of the data being shared, with another lockdown value, wherein the lockdown value and the another lockdown value are indicative of disablement of access to all the data access-controlled by the first user, and wherein current value is different from the another current value.

4. The method of claim 1, wherein the at least one setting comprises a visibility setting with the current value.

5. The method of claim 1, wherein the at least one setting comprises a personalization setting with the current value.

6. The method of claim 1, wherein the lockdown value restricts all end users except the first user from accessing the data.

7. The method of claim 1, further comprising removing information associated with the first user from accessing by a search engine.

8. The method of claim 1, wherein the at least one other user has previously accessed the shared data.

9. The method of claim 1, wherein the reversing is performed sequentially, in a sequence that is ordered based on at least one of groups, circles, social graphs, or accounts.

10. The method of claim 1, further comprising providing the user with control of the disablement by the restricting based on a type of content being accessed.

11. The method of claim 1, wherein the restricting of the access is performed on a per-page basis.

12. A computer-implemented method for disabling at least one other user from accessing all data controlled by a first user, the method comprising:

receiving, by a hardware processor, a request from the first user to disable all the data controlled by the first user and shared with the at least one other user, the data being associated with a plurality of accounts, wherein the first user can control access to the data based on at least one setting;

in response to the request, the hardware processor modifying, without further action by the first user, the at least one setting by replacing a current value indicative of at least some of the data being shared, with a lockdown value indicative of disablement by restricting access to an access control list for all the data access-controlled by the first user for at least one of the plurality of online accounts, so as to prevent the at least one other user from accessing any of the data controlled by the first user, wherein prior to the modifying, a snapshot is saved that comprises the current value being associated with the at least one setting prior to the disablement at a time of the request from the first user; and in response to the another request received from the first user to restore access to at least some of the data, reversing the at least one setting that was disabled by the disabling, based on the snapshot, and by using the snapshot, determining a prior value of the at least one setting at the time of the request from the first user, and setting the value of the at least one setting to the prior value, wherein the reversing is performed sequentially, in a sequence that is ordered based on at least one of groups, circles, social graphs, or accounts.

13. The computer-implemented method of claim 12, wherein the modifying further comprises the hardware processor modifying, without further action by the first user, another one of the at least one setting by replacing another current value indicative of at least some of the data being shared, with another lockdown value, wherein the lockdown value and the another lockdown value are indicative of disablement of access to all the data access-controlled by the first user, and wherein current value is different from the another current value.

14. The computer-implemented method of claim 12, wherein the user is provided with an option to control which of the plurality of online accounts are disabled by the restricting, and wherein the option to control is independent of a number or a type of the online accounts.

15. A non-transitory computer readable medium having stored therein computer executable instructions for disabling at least one other user from accessing all data controlled by a first user, the instructions comprising:

receiving a request from the first user to disable access to the data access-controlled by the first user based on at least one setting, wherein the data are shared with at least one other user and associated with a plurality of online accounts;

in response to the request, modifying, without further action by the first user, the at least one setting by replacing a current value indicative of at least some of the data being shared, with a lockdown value indicative of disablement by restricting access to an access control list for all the data access-controlled by the first user for at least one of the plurality of online accounts, so as to prevent the at least one other user from accessing any of the data controlled by the first user, wherein prior to the modifying, a snapshot is saved that comprises the current value being associated with the at least one setting prior to the disablement at a time of the request from the first user; and in response to the another request received from the first user to restore access to at least some of the data, reversing the at least one setting that was disabled by the disabling, based on the snapshot, and by using the snapshot, determining a prior value of the at least one setting at the time of the request from the first user, and setting the value of the at least one setting to the prior value, wherein the user is provided with an option to control which of the plurality of online accounts are disabled by the restricting, and wherein the option to control is independent of a number or a type of the online accounts.

16. The non-transitory computer readable medium of claim 15, wherein the modifying further comprises modifying, without further action by the first user, another one of the at least one setting by replacing another current value indicative of at least some of the data being shared, with another lockdown value, wherein the lockdown value and the another lockdown value are indicative of disablement of access to all the data access-controlled by the first user, and wherein current value is different from the another current value.

17. At least one device comprising storage and at least one hardware processor configured to disable at least one other user from accessing all data controlled by a first user, wherein the at least one hardware processor:
- receives, by the at least one hardware processor, a request from the first user to disable all the data controlled by the first user and shared with the at least one other user and associated with a plurality of online accounts, wherein the first user can control access to the data based on at least one setting;
- in response to the request, the at least one hardware processor modifies, without further action by the first user, the at least one setting by replacing a current value indicative of the data being shared, with a lockdown value indicative of disablement by restricting access to an access control list for all data controlled by the first user for at least one of the plurality of online accounts, so as to prevent the at least one other user from accessing the shared data, wherein prior to the modifying, a snapshot is saved that comprises the current value being associated with the at least one setting prior to the disablement at a time of the request from the first user; and
- in response to the another request received from the first user to restore access to at least some of the data, reversing the at least one setting that was disabled by the disabling, based on the snapshot, and by using the snapshot, determining a prior value of the at least one setting at the time of the request from the first user, and setting the value of the at least one setting to the prior value,
- wherein the user is provided with an option to control which of the plurality of online accounts are disabled by the restricting, and wherein the option to control is independent of a number or a type of the online accounts.

18. A non-transitory computer readable medium having stored therein computer executable instructions for disabling access to all data that are access-controlled by a first user, the instructions comprising:
- receiving a request from the first user to disable access to the data that are access-controlled by the first user based on at least one setting, wherein the data are shared with at least one other user and associated with a plurality of online accounts; and
- in response to the request, modifying, without further action by the first user, the at least one setting by replacing a current value indicative of at least some of the data being shared, with a lockdown value indicative of disablement by restricting access to an access control list for all the data access-controlled by the first user for at least one of the plurality of online accounts, so as to prevent the at least one other user from accessing any of the data, wherein prior to the modifying, a snapshot is saved that comprises the current value being associated with the at least one setting prior to the disablement at a time of the request from the first user; and
- in response to the another request received from the first user to restore access to at least some of the data, reversing the at least one setting that was disabled by the disabling, based on the snapshot, and by using the snapshot, determining a prior value of the at least one setting at the time of the request from the first user, and setting the value of the at least one setting to the prior value,
- wherein the reversing is performed sequentially, in a sequence that is ordered based on at least one of groups, circles, social graphs, or accounts.

19. At least one device comprising storage and at least one hardware processor configured to disable access to all data that are access-controlled by a first user, wherein the at least one hardware processor:
- receives, by the at least one hardware processor, a request from the first user to disable access to the data that are access-controlled by the first user based on at least one setting, wherein the data are shared with at least one other user and associated with a plurality of online accounts;
- in response to the request, the at least one hardware processor modifies, without further action by the first user, the at least one setting by replacing a current value indicative of at least some of the data being shared, with a lockdown value indicative of disablement by restricting access to an access control list for all the data access-controlled by the first user for at least one of the plurality of online accounts, so as to prevent the at least one other user from accessing any of the data, wherein prior to the modifying, a snapshot is saved that comprises the current value being associated with the at least one setting prior to the disablement at a time of the request from the first user; and
- in response to the another request received from the first user to restore access to at least some of the data, reversing the at least one setting that was disabled by the disabling, based on the snapshot, and by using the snapshot, determining a prior value of the at least one setting at the time of the request from the first user, and setting the value of the at least one setting to the prior value,
- wherein the user is provided with an option to control which of the plurality of online accounts are disabled by the restricting, and wherein the option to control is independent of a number or a type of the online accounts.

20. The at least one device comprising storage and at least one hardware processor of claim 19, wherein the modifying further comprises modifying, without further action by the first user, another one of the at least one setting by replacing another current value indicative of at least some of the data being shared, with another lockdown value, wherein the lockdown value and the another lockdown value are indicative of disablement of access to all the data access-controlled by the first user, and wherein current value is different from the another current value.

* * * * *